(12) United States Patent
Rose

(10) Patent No.: US 7,836,594 B2
(45) Date of Patent: *Nov. 23, 2010

(54) METHOD FOR RESTORING AIRFOIL TIP CONTOUR

(75) Inventor: William M. Rose, Warren, MA (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,901

(22) Filed: Oct. 16, 2007

(65) Prior Publication Data
US 2009/0097983 A1 Apr. 16, 2009

(51) Int. Cl.
*B23P 6/00* (2006.01)

(52) U.S. Cl. ............... 29/889.1; 29/889.7; 29/402.01; 29/402.04; 29/402.05; 29/402.06; 29/402.07

(58) Field of Classification Search ............... 29/889.1, 29/889.7, 402.01, 402.04, 402.05, 402.06, 29/402.07, 402.11, 402.13, 402.16
See application file for complete search history.

(56) References Cited
U.S. PATENT DOCUMENTS

| | | | |
|---|---|---|---|
| 4,128,929 A * | 12/1978 | DeMusis | 29/889.1 |
| 4,726,104 A | 2/1988 | Foster | |
| 4,851,188 A | 7/1989 | Schaefer | |
| 5,551,840 A | 9/1996 | Benoit | |
| 5,644,293 A | 7/1997 | Owens | |
| 5,794,338 A * | 8/1998 | Bowden et al. | 29/889.1 |
| 5,972,424 A | 10/1999 | Draghi | |
| 5,993,297 A * | 11/1999 | Hyatt et al. | 451/53 |
| 6,725,540 B2 | 4/2004 | Bose | |
| 6,739,960 B2 | 5/2004 | Sauer | |
| 6,883,234 B2 | 4/2005 | Packman | |
| 7,007,382 B2 | 3/2006 | Mantel | |
| 7,101,263 B2 | 9/2006 | Schwartz | |
| 2006/0168808 A1 | 8/2006 | Lin | |

OTHER PUBLICATIONS

U.S. Appl. No. 11/872,883, filed Oct. 16, 2007.

* cited by examiner

*Primary Examiner*—Rick K Chang
(74) *Attorney, Agent, or Firm*—Carlson, Gaskey & Olds

(57) ABSTRACT

A blade is repaired by utilizing a super abrasive machining quill and/or wheel to form the contour and restore the height of the blade. By utilizing super abrasive machining, the contour and height can be quickly returned to desired dimensions by removing unwanted added material.

4 Claims, 2 Drawing Sheets

METHOD FOR RESTORING AIRFOIL TIP CONTOUR

BACKGROUND OF THE INVENTION

This application relates to a method of repairing a compressor or turbine blade airfoil, wherein super abrasive machining (SAM) quills are utilized to form the contour on the airfoil.

Gas turbine engines are known, and typically include a plurality of sections mounted in series. Two of the sections are the turbine section and the compressor section. These sections each include a plurality of rotors, each mounting a plurality of circumferentially spaced blades.

Air enters a gas turbine engine via a fan. Some air is bypass air, while some air enters a compressor section, where it is compressed. The compressed air moves downstream where it is mixed with fuel and is combusted in a combustor section. The hot products of combustion then move downstream over the turbine blades, driving them to rotate. The turbine blades exist in a very harsh environment, and may also be subject to rubbing with spaced stationary surfaces.

The turbine blades as known have very complex structures. As an example, complex cooling channels are formed within the blades, and receive cooling air to assist the blades in resisting high temperatures.

Even with the design of the cooling channels, etc., turbine blades will often wear. This is particularly true at the tip of an airfoil on the blade. Since the blades are formed with the complex channels, they are expensive. Thus, rather than simply replace worn blades, it has become standard in the industry to repair the blades.

The compressor blades are not subject to the high temperatures that the turbine blades face, but have their own challenges. As an example, sand or other impurities can damage the blade. Compressor blades are also repaired.

When either type blade has worn at the outer tip of its airfoil, one common technique for repairing the blade is to apply a weld material at the tip to return the blade to its original height. This weld material must then be machined such that it approximates the desired airfoil shape and height.

In the prior art, hand blending techniques, and grinding wheels are utilized. Also, milling may be used for restoring the tip and upper wall areas. Typically, hand blending is performed after a milling operation to meet finish requirements.

The prior art techniques are relatively time-consuming. Moreover, for smaller blades having an airfoil that curves around a smaller radius of curvature, the prior art grinding and machining tools may be too large.

Super abrasive machining techniques have been known and have been utilized for originally forming portions of turbine blades. As an example, U.S. Pat. No. 7,101,263 discloses a super abrasive machine tool. However, super abrasive machining techniques have not been utilized for repairing the tips of blade airfoils.

SUMMARY OF THE INVENTION

In a disclosed embodiment of this invention, a blade has its airfoil tip repaired by applying a welding material to extend the tip back toward its original height. Excess material is then machined away by using a super abrasive machining (SAM) technique to return the contour of the airfoil to its desired shape. A quill having SAM materials is utilized to return the contour to its original shape. Another SAM tool, such as a grinding wheel, may then be utilized to return the airfoil to its desired height. By utilizing the smaller SAM quill, one can machine a relatively small radius of curvature on the airfoil.

These and other features of the present invention can be best understood from the following specification and drawings, the following of which is a brief description.

DETAILED DESCRIPTION OF THE PREFERRED EMBODIMENT

Figure 1:
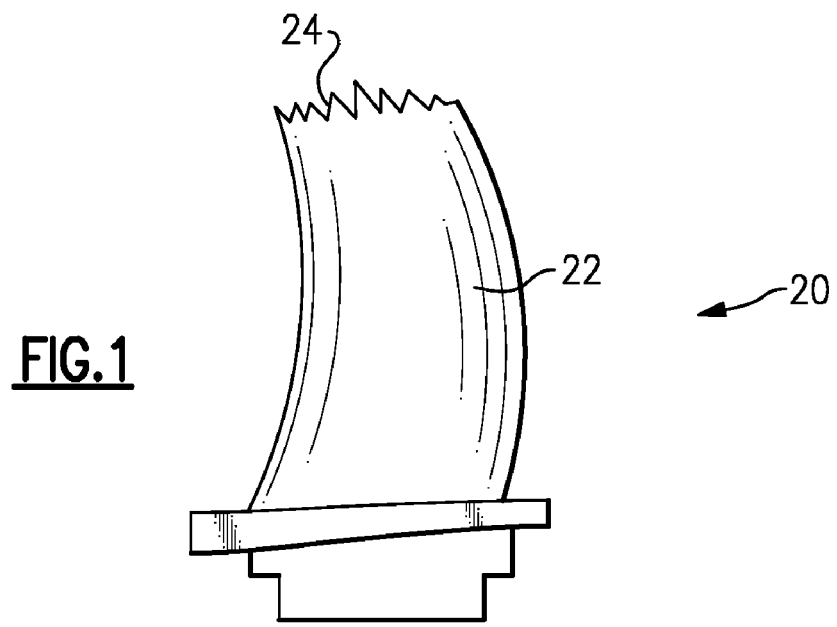
FIG. 1 shows a first step in the repair of a turbine blade.

FIG. 1 shows a worn turbine blade 20. As known, an airfoil 22 extends toward a tip. The tip is shown to be worn at 24. Such a turbine blade 20 will typically be taken out of service for repair. While the drawings show a turbine blade, it should be understood the invention extends to repair of compressor blades also.

Figure 2:
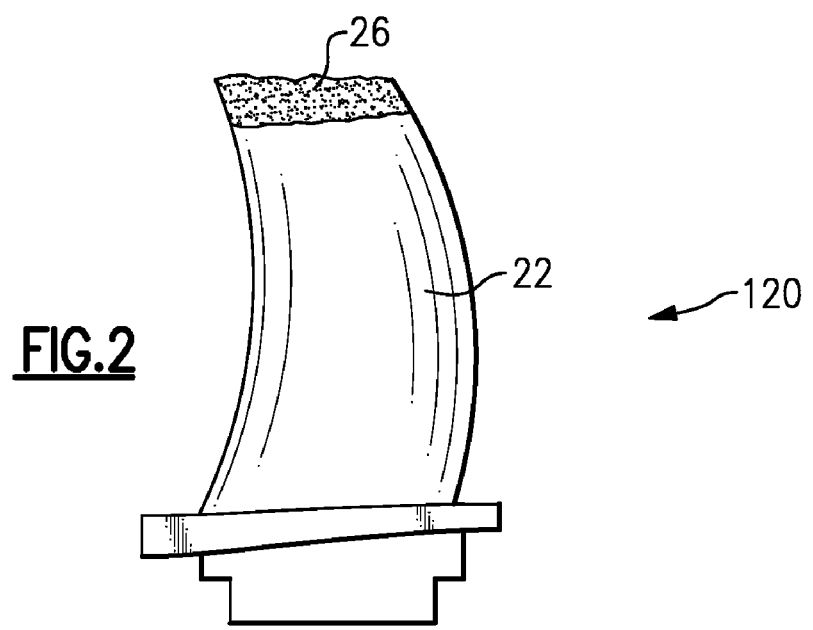
FIG. 2 shows a second step.

FIG. 2 shows a first step in the repair of the blade 120. As shown, the airfoil 22 now is returned beyond its original height by adding weld material 26 to extend the height from the worn shape 24 of FIG. 1. The weld material is deposited at the tip, but may extend too far, and also would typically not have the desired contour shape for the airfoil 22.

Figure 3A:
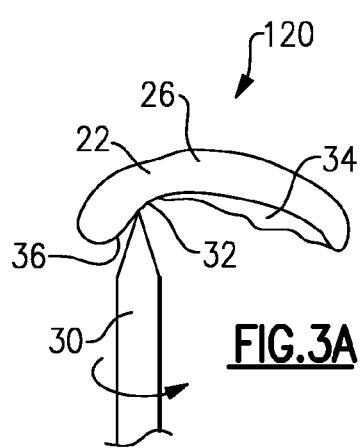
FIG. 3A shows a subsequent step.

Thus, as shown in FIG. 3A, a super abrasive machine quill 30 is now used to machine the contour 32 of the airfoil 120. As shown, there may be excess weld material 34 which is cut away by the SAM quill 30 to define the final shape 36.

Figure 3B:
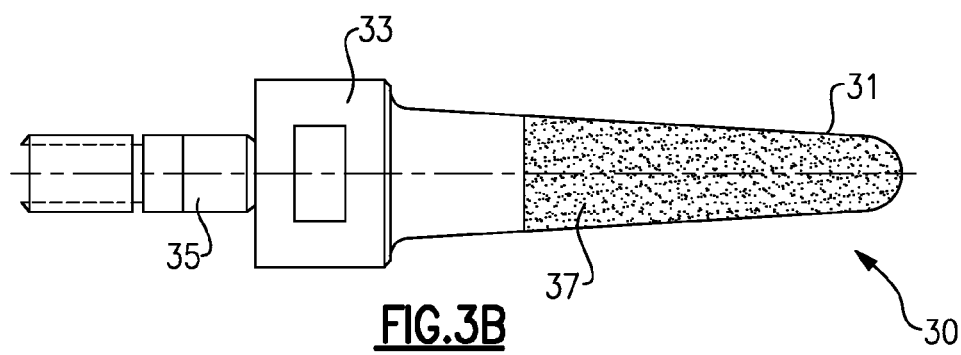
FIG. 3B shows a tool for performing the FIG. 3A step.

FIG. 3B shows a known SAM quill 30. As known, a tip 31 performs the actual machining, and has a smaller diameter than a base portion 33. The base portion 33 has a larger diameter than a shaft 35 that is received in a spindle for driving the SAM quill 30 at relatively high speeds. As known, SAM quills have their abrasive material 37 formed from a group including diamonds, and cubic boron nitride. An example of a known quill is disclosed in U.S. Pat. No. 7,101,263, the description of which is incorporated herein by reference.

With use of the SAM machining, a relatively small diameter quill 30 is used to form the contour 32 as shown in FIG. 3A. In this manner, a blade having a relatively small radius of curvature can be machined back to its desired shape.

Figure 4:
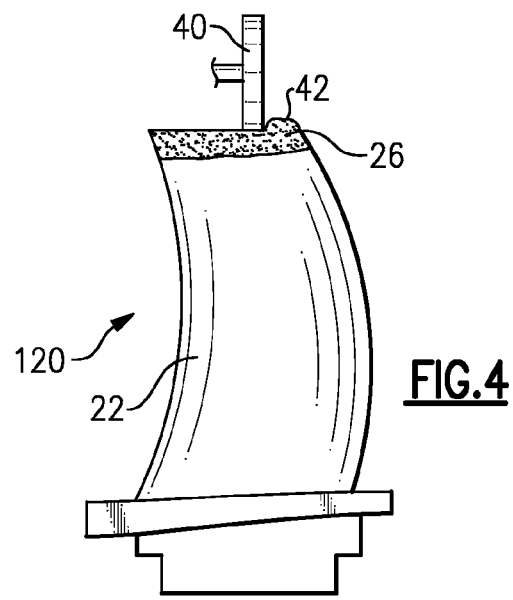
FIG. 4 shows another step.

FIG. 4 shows a subsequent step, wherein the weld material 26 is cut away by an SAM grinding wheel 40 to remove excess material 42, and return the airfoil 22 to its desired height.

Figure 5A:
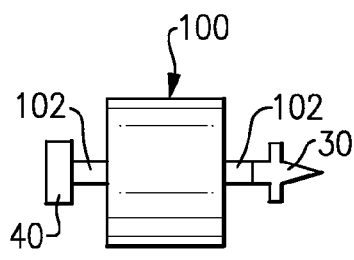
FIG. 5A schematically shows a first machining embodiment.

FIG. 5A shows an embodiment wherein a tool 100 has a dual spindle 102 extending to each side. Grinding wheel 40 is mounted to one side, and SAM quill 30 is mounted to the opposed side.

Figure 5B:
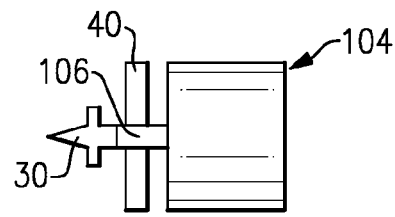
FIG. 5B shows a second machining embodiment.

FIG. 5B shows another machining embodiment 104 wherein a single spindle 106 mounts grinding wheel 40 and quill 30.

Figure 5C:
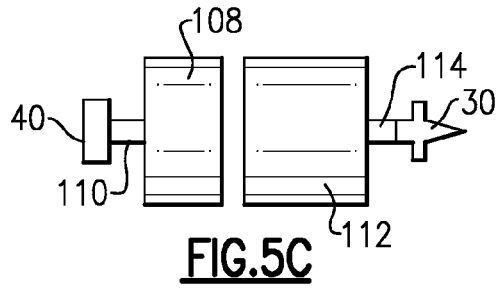
FIG. 5C shows a third machining embodiment.

FIG. 5C shows yet another embodiment where one machine 108 includes a spindle 110 driving grinding wheel 40, while a second machine 112 includes a spindle 114 driving SAM quill 30.

In each of FIGS. 5A, 5B and 5C, the size of the grinding wheels 40 are not shown to scale relative to the SAM quills 30.

With this method, the blade can be quickly and accurately returned to its desired shape and height.

While a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of repairing an airfoil comprising the steps of:
   (1) depositing additional material at a tip of a worn blade; and
   (2) removing some of the additional material to form a desired contour for the airfoil, utilizing a super abrasive machining quill, wherein the quill has an abrasive tip, formed of a material selected to include at least one of diamond and cubic boron nitride, the additional material being deposited by welding, and the airfoil being a turbine blade or a compressor blade: and removing unwanted portions of the additional material utilizing a super abrasive machining grinding wheel to return a height of the blade to a desired height.

2. The method as set forth in claim 1, wherein a dual spindle machine has a single spindle extending to both sides of the machine, and the grinding wheel is mounted to one side, with the quill mounted to an opposed side.

3. The method as set forth in claim 1, wherein a machine drives a single spindle, and both the grinding wheel and quill are mounted on the single spindle.

4. The method as set forth in claim 1, wherein two separate machines drive separate spindles, with the grinding wheel mounted to one of the machines, and the quill mounted to the other of the machines.

* * * * *